United States Patent
Nakahara

(10) Patent No.: US 8,913,558 B2
(45) Date of Patent: Dec. 16, 2014

(54) LOCAL ROUTING NODE

(75) Inventor: Naruhito Nakahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 13/545,693

(22) Filed: Jul. 10, 2012

(65) Prior Publication Data

US 2013/0051319 A1 Feb. 28, 2013

(30) Foreign Application Priority Data

Aug. 25, 2011 (JP) .................................. 2011-183220

(51) Int. Cl.
*H04W 4/00* (2009.01)
*H04W 40/00* (2009.01)
*H04W 8/08* (2009.01)

(52) U.S. Cl.
CPC .............. *H04W 40/00* (2013.01); *H04W 8/082* (2013.01)
USPC .......................................... 370/328; 455/524

(58) Field of Classification Search
USPC .......................................... 370/328; 455/524
See application file for complete search history.

(56) References Cited

U.S. PATENT DOCUMENTS

| | | | |
|---|---|---|---|
| 2003/0043838 A1* | 3/2003 | Shimada et al. | 370/442 |
| 2009/0168787 A1* | 7/2009 | Ansari et al. | 370/401 |
| 2009/0238115 A1 | 9/2009 | Yamane | |
| 2010/0020812 A1 | 1/2010 | Nakamura et al. | |
| 2012/0008554 A1* | 1/2012 | Kim et al. | 370/328 |
| 2013/0077614 A1* | 3/2013 | Ni | 370/338 |

FOREIGN PATENT DOCUMENTS

| | | |
|---|---|---|
| JP | 2009-232106 A | 10/2009 |
| JP | 2010-088013 A | 4/2010 |

OTHER PUBLICATIONS

Hanks et al, "RFC 1701 Generic Routing Encapsulation (GRE)", Oct. 1994.
Farinacci et al, "RFC 2784 Generic Routing Encapsulation (GRE)", Mar. 2000.

* cited by examiner

*Primary Examiner* — Sai-Ming Chan
(74) *Attorney, Agent, or Firm* — Volpe and Koenig, P.C.

(57) ABSTRACT

Since user data from a mobile station always passes a gateway, even in communication between mobile stations in a cell of the same base station in the same mobile station system, user data is transferred to the gateway and the trombone phenomenon occurs. Traffic is concentrated in the gateway and networks near the gateway. A local routing node includes a unit for passing signaling of communication between a base station and the gateway according to a protocol of the mobile communication system, for extracting and decapsulating bearer data transferred between the base station and the gateway, and for thereby obtaining and transferring user data and a unit for encapsulating and transferring user data. The local routing node extracts bearer data, which is conventionally transferred up to the gateway, and transfers the data to the network.

7 Claims, 21 Drawing Sheets

FIG. 3

| INDEX | MS IP ADDRESS | BS IP ADDRESS | ASN-GW IP ADDRESS | DOWNLINK GRE KEY | UPLINK GRE KEY |
|---|---|---|---|---|---|
| 1 | 192.10.20.1 | 192.10.10.2 | 192.30.30.200 | 0x00010002 | 0xFFFF0001 |
| 2 | 192.10.20.5 | 192.10.10.7 | 192.30.30.200 | 0x00010005 | 0xFEEE0002 |
| .. | .. | .. | .. | .. | .. |
| n | 172.20.5.100 | 192.168.100.5 | 192.30.30.201 | 0x0031000E | 0x00E10009 |

| INDEX | DOWNLINK BYTE COUNT | UPLINK BYTE COUNT | DOWNLINK PACKET COUNT | UPLINK PACKET COUNT |
|---|---|---|---|---|
| 1 | 1034240 | 3855232 | 2020 | 30119 |
| 2 | 51200 | 256000 | 100 | 500 |
| : | : | : | : | : |
| n | 3072000 | 896000 | 6000 | 7000 |

FIG. 6

| INDEX | MS IP ADDRESS | BS IP ADDRESS | DOWNLINK GRE KEY | UPLINK GRE KEY | DOMAIN |
|---|---|---|---|---|---|
| 1 | 192.168.20.1 | 192.168.10.2 | 0x00010002 | 0xFFFF0001 | hitachi.com |
| 2 | 192.168.20.5 | 192.168.10.7 | 0x00010005 | 0xFEEE0002 | mobile.com |
| .. | .. | .. | .. | .. | .. |
| n | 172.20.5.100 | 192.168.100.5 | 0x0031000E | 0x00E10009 | guest.com |

FIG. 7

| INDEX | BS IP ADDRESS | LRN IP ADDRESS |
|---|---|---|
| 1 | 192.168.10.2 | 192.168.10.10 |
| 2 | 192.168.10.7 | 192.168.10.10 |
| : | : | : |
| m | 192.168.100.5 | 192.168.100.21 |

FIG. 8

| INDEX | DOMAIN | LRN MODE |
|---|---|---|
| 1 | hitachi.com | ON |
| 2 | mobile.com | OFF |
| : | : | : |
| n | guest.com | OFF |

LOCAL ROUTING NODE

INCORPORATION BY REFERENCE

The present application claims priority from Japanese application JP2011-183220 filed on Aug. 25, 2011, the content of which is hereby incorporated by reference into this application.

BACKGROUND OF THE INVENTION

The present invention relates to a mobile communication technique, and in particular, to a device for enhancing load distribution performance in a communication network used in a mobile communication system.

Recent mobile communication systems are constructed in a hierarchic configuration.

Description will be given of a WiMAX system as an example of the mobile communication system having a hierarchic configuration.

FIG. 23 shows an outline of the WiMAX system. The WiMAX system includes Mobile Stations (MS) 400 to 402, Base Stations (BS) 300 and 310, an access service network-gateway (ASN-GW) 200 to control the base stations, a Connectivity Service Network (CSN) 500, and a CSN 501 of a Mobile Virtual Network Operator (MVNO). Each of the CSN 500 and 501 includes functions of the triple A (AAA for Authentication, Authorization, and Accounting) associated with accounting and authentication. In a system supporting the mobile IP, the CSN 501 includes a Home Agent (HM). When internet services are provided, the CSN 500 and 501 are coupled with an internet 510.

In the hierarchic configuration of the WiMAX system, the ASN-GW 200 supervises a plurality of base stations 300 and 310 and the CSN 500 supervises a plurality of ASN-GW 200. One of the reasons why the mobile communication system is constructed in the hierarchic structure is implementation of mobility for the mobile stations 400 to 402. Assume, for example, that the mobile station 400 moves from the base station 300 to the base station 310. The start-point mobile station 300 and the end-point mobile station 310 are under control of one ASN-GW, i.e., the ASN-GW 200. Hence, it is possible for the ASN-GW 200 to detect the movement of the mobile station 400 to thereby continuously carry out an associated service, namely, to conduct handover of the service. Further, since the base stations 300 and 310 are installed at locations apart from the ASN-GW 200 in many cases, there is employed a network 520 between the base stations and the ASN-GW 200. The network 520 is coupled with an internet 511 depending on a communication enterprise as the owner of the network 520.

FIG. 24 shows a connection sequence of WiMax stipulated by the WiMAX Forum as an organization for standardization.

The mobile station 402, the base station 310, the ASN-GW 200, and the CSN 500 communicate messages conforming to the standard with each other to establish a wireless path 822 between the mobile station 402 and the base station 310, a GRE capsulation path 823 between the base station 310 and the ASN-GW 200, and a mobile IP path 825 between the ASN-GW 200 and the CSN 500. When accessing the internet, the mobile station 402 sends user data in the form of wireless data 7111 to the base station 310. When the user data is received, the base station 310 transfers the user data in the form of GRE capsulation data 7112 to the ASN-GW 200. The ASN-GW 200 sends the user data in the form of mobile IP capsulation data 7113 to the CSN 500. The CSN 500 transfers to the internet 510 the user data in the format of the user data transmitted from the mobile station 402.

FIG. 25 shows a packet format of the GRE capsulation data. This is a GRE packet format of GRE capsulation data between the base station and the ASN-GW. The GRE packet includes an IP header 7050, a GRE header 7051, and user data 7052. The user data 7052 is an IP packet transmitted from the mobile station 402. The IP header 7050 includes an IP address of the base station 310 and an IP address of the ASN-GW 200. These addresses are used as communication addresses of the base station 310 and the ASN-GW 200 terminating a GRE tunnel. The GRE header 7051 includes a GRE key prescribed by RFC2784 and RFC1701 and is used to identify the mobile station 402.

In the mobile communication system hierarchically configured as above, the user data communicated by the mobile station 402 travels as the wireless data 7111 via a wireless interval to the base station 310 and then to the ASN-GW 200 via the network 520 between the base station 310 and the ASN-GW 200 and arrives at the CSN 500. The CSN 500 extracts user data 7114 from the mobile IP capsulation data 7113 to transfer the user data 7114 according to an associated routing procedure.

SUMMARY OF THE INVENTION

In the conventional mobile communication system described above, user data transmitted from, for example, the mobile station 400 in FIG. 23 is transferred via the ASN-GW 200 in any situation to the CSN 500 and is then routed by the CSN 500. Hence, even when the communication destination of the mobile station 400 is the mobile station 401 and these mobile stations are coupled with the same base station 300 in the mobile communication system, user data 702 sent from the mobile station 400 is transferred to the CSN 500 to be routed according to a destination address of the user data extracted by the CSN 500. The user data 702 is returned again via the ASN-GW 200 to the transmission source BS 300 and is transferred to the communication destination MS 401. This disadvantageously results in a trombone phenomenon.

The network 520 between the base station 300 and the ASN-GW 200 is owned by a mobile communication service operator or another communication service operator. In either case, the load imposed on the network is rapidly increasing due to recent development of the mobile communication and the growing volume of contents. Hence, a need to lower the load on the network 520 or a need to distribute the load is increasing.

However, in the conventional mobile communication system, even in the communication between mobile stations coupled with the same base station, the user data to be communicated is transferred via the network 520 to the CSN 500 and is then returned again through the network 520. It is hence not possible to mitigate the load imposed on the network 520. Depending on communication service operators, even there exists a situation in which the network 520 is linked with the internet 511, when the mobile station 402 attempts to access the internet, the access request is transferred via the network 520 to the ASN-GW 200 to be fed via the CSN to the internet 510. This resultantly increases traffic on the path through the network 520, the ASN-GW 200, and the CSN 500.

To overcome the difficulty according to the present invention, there is provided a gateway in a mobile communication system constructed in a hierarchic configuration in which a plurality of base stations are coupled via a network with a gateway and each of the base stations communicates with a plurality of mobile stations, comprising a local routing node for accommodating some of the base stations and for linking via the network to the gateway. The gateway comprises a local routing node control unit. The local routing node control unit of the gateway creates information to determine a call which turns back in the local routing node without passing the network, and notifies the information to the local routing node. The local routing node stores the information notified from the gateway in a table, and refers, for a connection request from one of the base stations accommodated in the local routing node, to the table and conducts, if it is determined that local routing is to be conducted for the connection request, the local routing for the connection request in the local routing node without using the network and the gateway.

According to the present invention, the trombone phenomenon is removed and the network load is lowered in the mobile communication system. Concentration of traffic is prevented and the load is distributed in the hierarchic system.

Due to the turn-back communication in the local routing, the communication delay time is advantageously reduced.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of a judge table to determine whether or not received data is a local routing target;

FIG. 6 is a diagram showing an example of a mobile station information table;

FIG. 7 is a diagram showing an example of a local routing identification table;

FIG. 8 is a diagram showing an example of a local routing judge table;

DESCRIPTION OF THE EMBODIMENTS

First Embodiment

Description will now be given of an embodiment of a WiMAX system according to the present invention.

Figure 1:
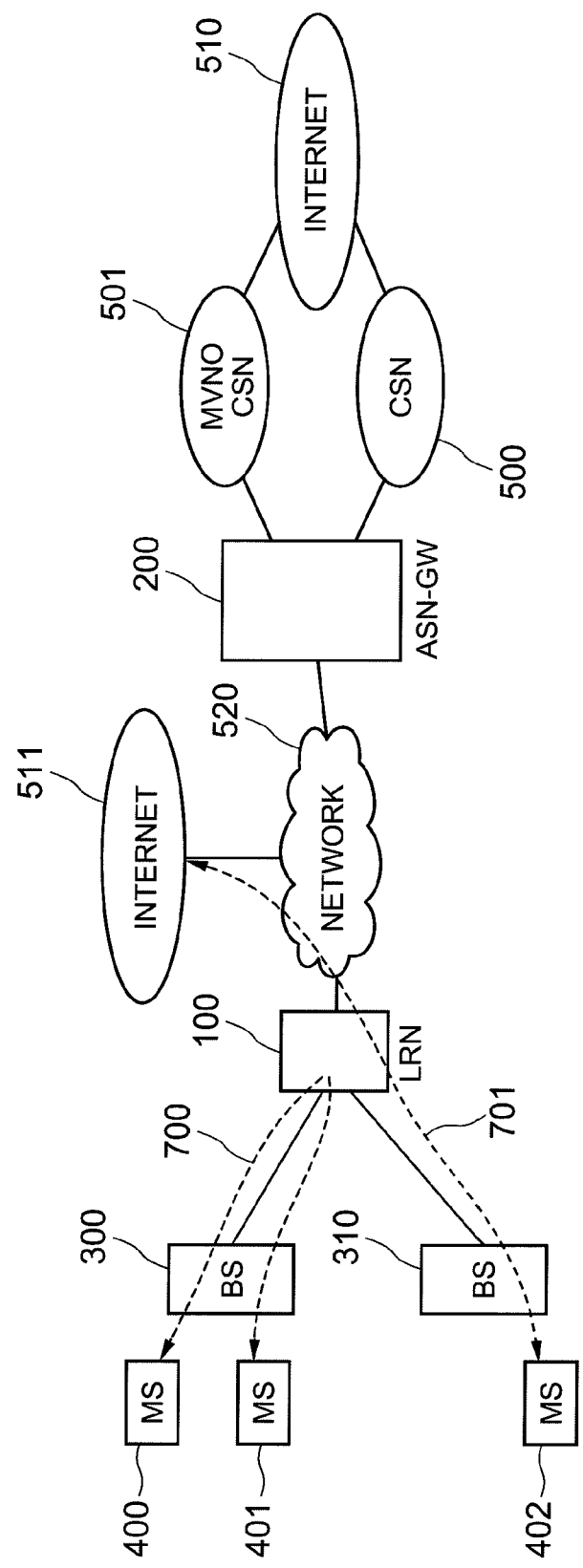
FIG. 1 is a diagram showing an embodiment of a mobile communication system according to the present invention.

FIG. 1 shows a configuration of the WiMAX system of the embodiment. The WiMAX system includes mobile stations 400 to 402, base stations 300 and 310, a local routing node (LNR) 100, an ASN-GW 200, a CSN 500, and an MVNO CSN 501. The LRN 100 represents an aspect of the configuration according to the present invention. The LRN 100 is coupled via a network 520 with the ASN-GW 200. The CSN 500 and the MVNO CSN 501 are linked with an internet 510. The LRN 100 accommodates a plurality of base stations 300 and 310 and is coupled with the ASN-GW 200.

Figure 2:
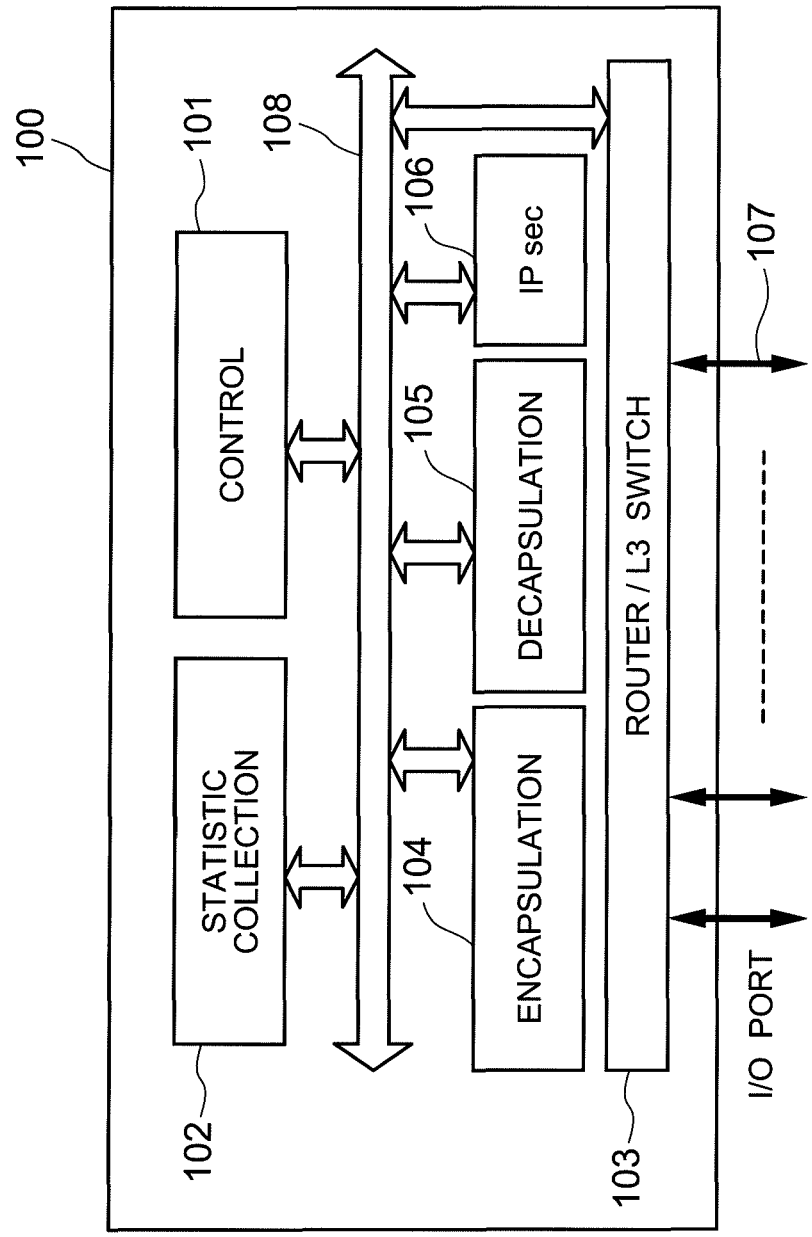
FIG. 2 is a diagram showing a configuration of a local routing node in an embodiment of the present invention.

FIG. 2 shows a configuration of a local routing node in an embodiment of the present invention.

The LRN 100 includes I/O ports 107 including physical interfaces to connect to the base stations 300 and 310 and the network 520, a router/L3 switch section 103 to transmit data received from an I/O port 107 to an I/O port 107 according to a transmission source and a transmission destination of the data, an encapsulation section 104 to encapsulate the received data, a decapsulation section 105 to decapsulate the encapsulated data, an IPsec section 106 to execute IPsec processing for the received data if the data is associated with IPsec, a statistic collection section 102 to collect quantity of received data, a controller 101 to control communication with the ASN-GW 200 and operation of the respective constituent components, and an internal bus 108 to couple the respective components with each other. The controller 101 includes a table to determine whether or not received data is a local routing target. Description will next be given of the table.

FIG. 3 shows an example of the judge table to determine whether or not received data is a local routing target.

The judge table includes an MS IP address of an associated mobile station, a BS IP address of a base station communicating with the mobile station, an ASN-GW IP address of an ASN-GW to which the mobile station is coupled via the base station, a downlink GRE key, an uplink GRE key, and an index. The downlink indicates a direction in which the user data is transferred from the ASN-GW 200 to the base station 300 or 310. The uplink indicates a direction in which the user data is transferred from the base station 300 or 310 to the ASN-GW 200. The value to be set to each item is notified by a control signal from the ASN-GW 200.

Figures 4, 5:
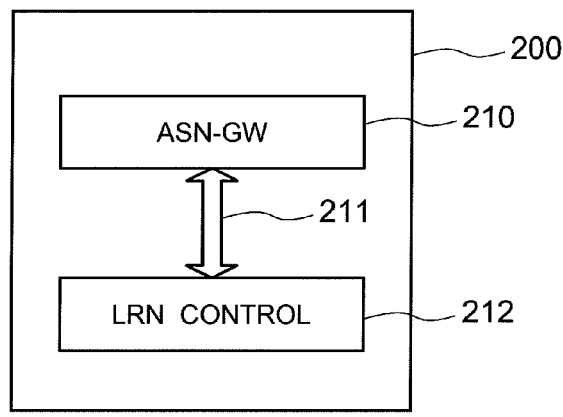
FIG. 4 is a diagram showing an example of a table having stored statistic information to be stored in local routing nodes.
FIG. 5 is a diagram to explain a configuration of an ASN-GW in an embodiment of the present invention.

FIG. 4 shows an example of a table having stored statistic information of received data as a local routing target in the statistic collection section 102.

The statistic collection section 102 includes a table to store statistic information of received data as the local routing target. The statistic information table includes a downlink byte count, an uplink byte count, a downlink packet count, and an uplink packet count for each index. The index of the statistic information table corresponds to that of the local routing judge table of FIG. 3.

Next, description will be given of a configuration of the ASN-GW.

FIG. 5 shows the configuration of the ASN-GW in an embodiment of the present invention.

As FIG. 5 shows, the ASN-GW includes two functional units, i.e., an ASN-GW section 210 and an LRN control section 212. The ASN-GW section 210 executes the conventional ASN-GW processing and the LRN control section 212 controls the LRN 100 and carries out local routing judgment. The LRN control section 212 includes three tables, namely, an MS information table, a table for use in the LRN identification processing, and a table for use with the local routing judgment. Description will be given of these tables by referring to FIGS. 6 to 8.

FIG. 6 shows an example of the mobile station information table held in the control section of the LRN 100.

The mobile station information table is a table implemented by adding a domain field to the elements of the table shown in FIG. 3. The domain field stores a domain name of a communication enterprise, an MVNO, or a service provider. The domain name indicates a company or an enterprise with which the mobile station has contracted.

FIG. 7 shows an example of the LRN identification table. This table includes a BS IP address and an LRN IP address associated with the BS IP address. For each base station, the table indicates an LRN to accommodate the base station.

FIG. 8 shows an example of the local routing judge table. This table includes a domain and an LRN mode corresponding to the domain. Assume that if the domain is associated with a local routing target, the LRN mode is on; otherwise, the LRN mode is off. For example, index 1 indicates that the domain is hitachi.com and the associated LRN mode is on. That is, user data of a mobile station having a domain name of hitachi.com is regarded as a local routing target. On the other hand, index 2 indicates that the LRN mode is off. That is, user data of a mobile station having a domain name of mobile.com is not regarded as a local routing target. Whether the LRN mode is set to on or off for each domain can be determined by a communication enterprise, an MVNO, or a service provider associated with the domain name.

Description will now be given of a connection sequence according to the present embodiment.

Figure 9:
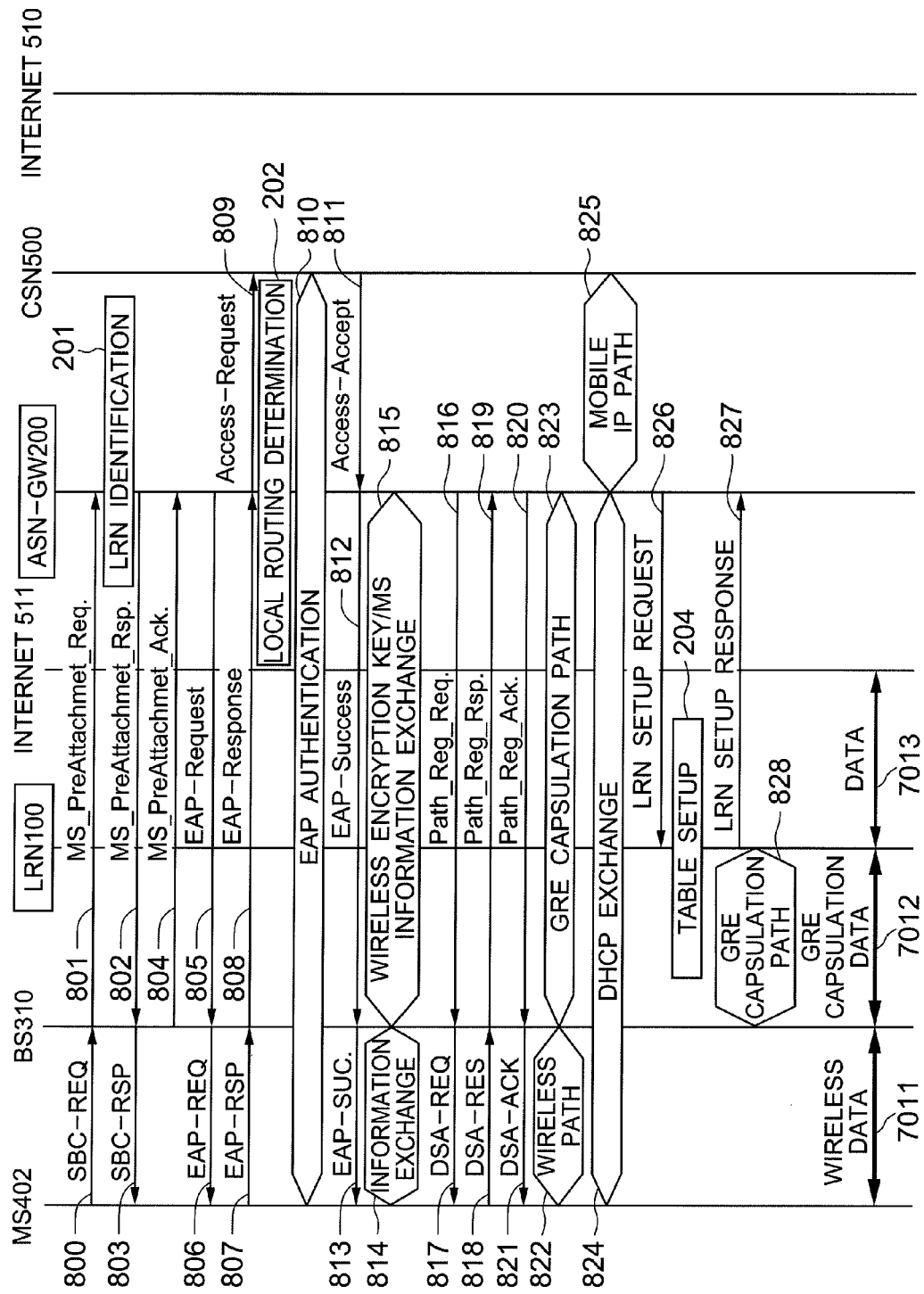
FIG. 9 is a signal sequence chart to explain an example of a local routing setup procedure.

FIG. 9 is a signal sequence chart to explain an example of a local routing setup procedure in the connection sequence.

When issuing a connection request, the mobile station 402 sends SBC-REQ 800 as a connection request to the base station 310. On receiving SBC-REQ 800, the base station 310 sends MS_PreAttachment_Req 801 as a connection request to the ASN-GW 200. When MS_PreAttachment_Req 801 passes the LRN 100, the LRN 100 conducts a switch function to carry out a routing operation and transfers the received data to the ASN-GW 200 according to the destination of the received data. On receiving MS_PreAttachment_Req 801, the ASN-GW 200 identifies, by use of the LRN identification table described in conjunction with FIG. 7, an LRN accommodating the base station 310 having transmitted MS_PreAttachment_Req 801.

Figure 10:
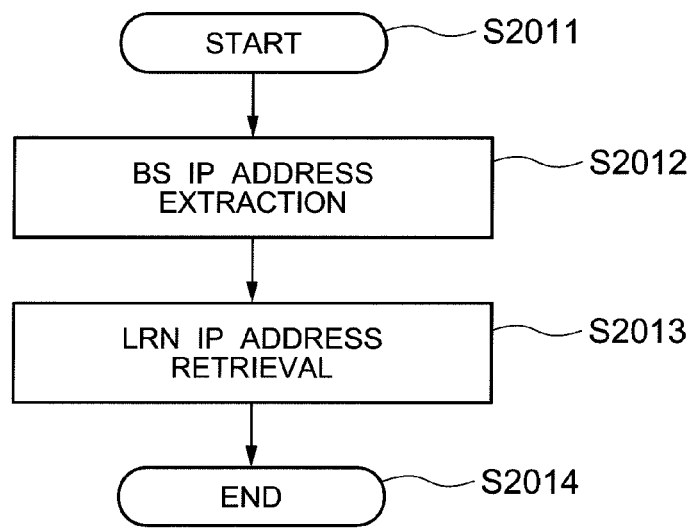
FIG. 10 is a flowchart to explain local routing identification processing.

FIG. 10 is a flowchart to explain processing to identify an LRN accommodating the base station 310 having transmitted the connection request.

When MS_PreAttachment_Req 801 is received, the system starts the processing of step 2012 shown in FIG. 10. In step 2012, an IP address of the base station is identified. Since MS_PreAttachment_Req 801 includes a BS identifier to identify the transmission source base station, the IP address of the base station is identified by the BS identifier. Or, it is also possible to determine the IP address of the base station by referring to the transmission source IP address contained in the IP header of the received data. After the BS IP address is identified, control goes to step 2013. In this step, an IP address of the LRN 100 is retrieved by use of the table shown in FIG. 7.

For example, when the BS IP address obtained from the received data is 192.18.10.7, a search is made through the LRN identification table of FIG. 7 for a BS IP address of 192.18.10.7. As a result, it is recognized that the BS IP address corresponds to index 2 of the LRN identification table. By referring to the LRN IP address field of index 2, the LRN IP address of the LRN accommodating the base station is determined as 192.168.10.10. If such BS IP address is absent from the table, the mobile station is not assumed as a local routing target. After the LRN IP address retrieval is finished, control goes to step 2014 to terminate the processing of the flow.

Returning to FIG. 9, when the LRN identification processing is completed, MS_PreAttachment_Rsp 802 is sent as a response message to MS_PreAttachment_Req 802 to the base station 310. After this point, signals required for the connection are communicated between the base station 310 and the ASN-GW 200 according to the connection sequence prescribed by WiMAX Forum. During the communication, the ASN-GW 200 receives EAP-Response 808 from the base station 310.

When EAP-Response 808 is received, the ASN-GW 200 conducts the local routing judgment.

Figure 11:
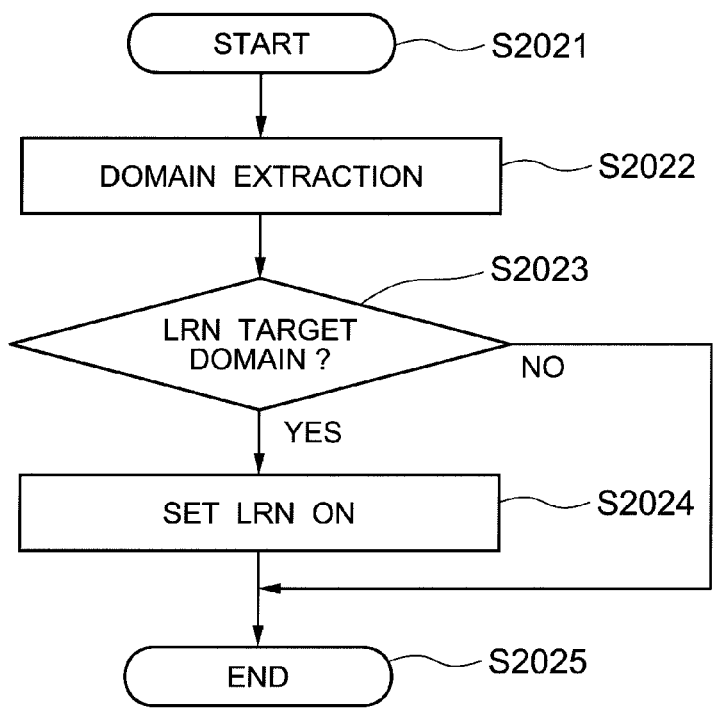
FIG. 11 is a flowchart of local routing judgment.

FIG. 11 shows a flowchart of local routing judgment processing. This processing is initiated at reception of EAP-Response 808. Control goes to step 2022 to extract a domain. EAP-Response 808 is a message stipulated by RFC3748 and stores therein an identity field including domain information. By referring to the identity field, it is possible to obtain the domain of the mobile station. After the domain is extracted, control goes to step 2023 to judge whether or not the mobile station 402 is a local routing target. The judgment is carried out by use of the local routing judge table of FIG. 8. In the local routing judge processing, a search is made through the judge table of FIG. 8 for the domain extracted in step 2022. As a result, if the domain is present in the table, the system obtains an index corresponding to the domain and then control goes to step 2024 if the LRN mode associated with the index is on, to judge that the mobile station is a local routing target. Thereafter, control goes to step 2025 to terminate the processing. If the LRN mode is off, the system judges that the mobile station is other than the local routing target and control goes to step 2025 to terminate the processing. Also, as a result of the search in step 2023, if the extracted domain is absent from the table, the system judges that the mobile station is other than the local routing target and control goes to step 2025.

Returning again to FIG. 9, when the local routing judgment is finished, the WiMAX connection sequence is continuously conducted to carry out EAP authentication 810 and wireless encryption key/MS information exchange 815. By communicating Path_Reg_Req 816, Path_Reg_Rsp 819, and Path_Reg_Ack 820, the uplink GRE key and the downlink GRE key required for the GRE capsulation between the base station 310 and the ASN-GW 200 are exchanged, to thereby establish a GRE capsulation path between the base station 310 and the ASN-GW 200 and a wireless path 822 between the mobile station 402 and the base station 310.

After the paths are established, DHCP exchange 824 is conducted between the mobile station 402 and the ASN-GW 200 to notify an MS IP address to be assigned to the mobile station 402, from the ASN-GW 200 to the mobile station 402. On the other hand, when the DHCP exchange 824 is conducted, a mobile IP path 825 is established between the ASN-GW 200 and the CSN 500.

After the DHCP exchange 824 and the mobile IP path 825 establishing operation are finished, if the local routing judgment 202 indicates that the mobile station is a local routing target, the ASN-GW 200 transmits an LRN setup request 826 to the IP address of the LRN 100 identified in the LRN identification 201.

Figure 12:
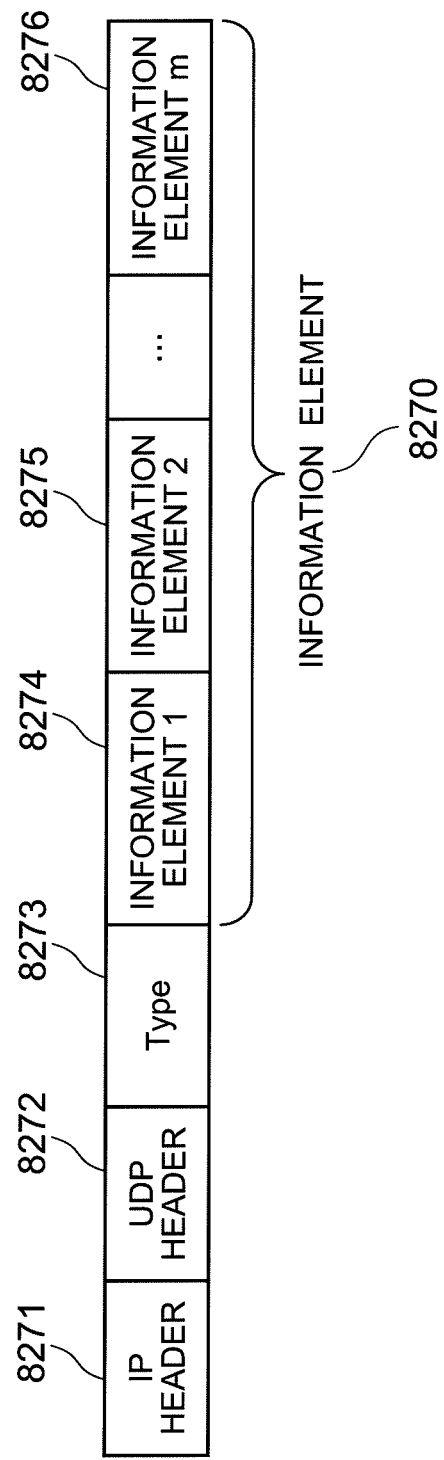
FIG. 12 is a diagram showing an example of a format to request the local routing setup.

FIG. 12 shows an example of a format of the LRN setup request. The LRN setup request includes an IP header 8271, a UDP header 8272, a type 8273, and information elements 8270. The type 8273 is employed to discriminate an LRN setup request 826 from an LRN setup response 827. The information elements 8270 store therein information pieces to be set from the ASN-GW 200 to the LRN 100. In the first embodiment, the LRN setup request 826 includes five information elements 8270, i.e., an MP IP address, a BS IP address, an ASN-GW 200 IP address, a downlink GRE key, and an uplink GRE key. When the system copes with IPsec, it is also possible to include, in addition to the five information elements, information pieces required for IPsec processing.

When the LRN setup request 826 sent from the ASN-GW 200 is received via an I/O port 107, the LRN 100 transfers the request 826 via the router/L3 switch section 103 to the controller 101. The controller 101 receives the LRN setup request 826 to interpret the request 826 and sets information elements 8270 of the message to the table shown in FIG. 3. Thereafter, the controller 101 creates an LRN setup response 827 and transmits the response 827 via the router/L3 switch section 103 and an I/O port 107 to the ASN-GW 200.

As a result, a GRE capsulation path 828 substantially equal to the GRE capsulation path 823 set up between the base station 310 and the ASN-GW 200 is established between the base station 310 and the LRN 100.

Next, description will be given of the local routing operation for user data in an example in which the mobile station 402 accesses the internet. To connect to the internet, the mobile station 402 transmits user data to a connection destination on the internet. The user data arrives via a wireless interval at the base station 310. The base station 310 conducts GRE encapsulation for the user data by use of a GRE key on the GRE capsulation path 823 established through the connection sequence described above, and then sends the data to the ASN-GW 200. Since the base station 310 is accommodated in the LRN 100, GRE capsulation data 7012 addressed to the ASN-GW 200 passes the LRN 100. The GRE capsulation data 7012 received by the LRN 100 is transferred via an I/O port 107 to the router/L3 switch section 103. The switch section 103 conducts a routing operation for the data as below.

Figure 13:
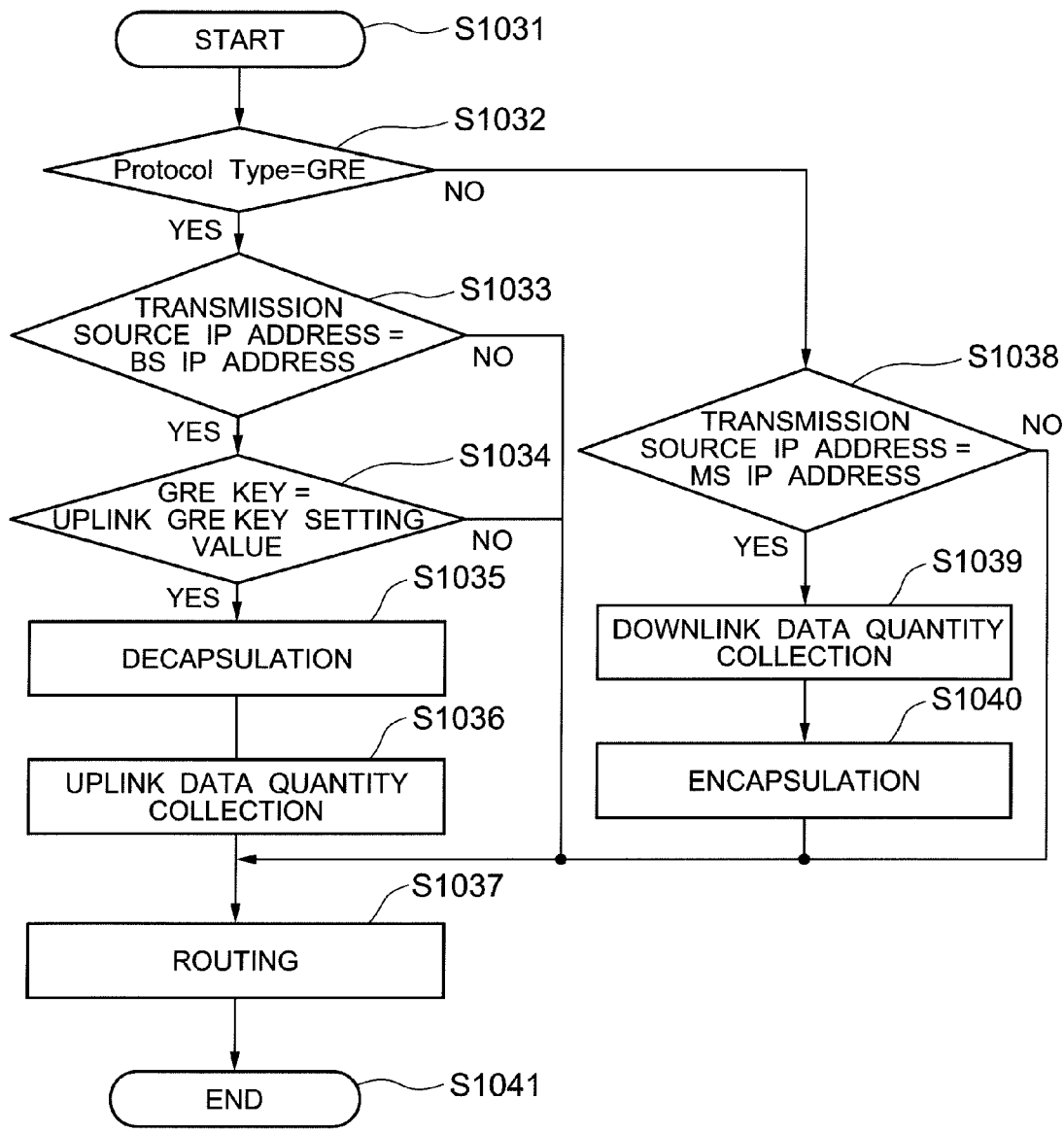
FIG. 13 is a flowchart to explain a routing operation in a local routing node.

FIG. 13 is a flowchart to explain the routing operation in the router/L3 switch section 103 of the LRN 100.

On receiving user data by the router/L3 switch section 103, the LRN 100 starts processing of the flow shown in FIG. 13 (step 1031). In step 1032, a check is made to determine whether or not the protocol type in the IP header of the received data is GRE. If the protocol type is GRE, control goes to step 1033. Otherwise, control goes to step 1038. In step 1038, whether or not the transmission destination address of the received data is an MS IP address is judged. Since the received data is access data to access the internet, the transmission destination address is other than the MS IP address. Hence, control goes to step 1037 to execute the routing processing based on the destination address in the IP header. Also, in the connection sequence between the base station 310 and the ASN-GW 200, steps 1032 and 1038 result in "no". Hence, the data is transferred to the ASN-GW 200 without conducting the local routing.

In step 1033, a search is made through the table of FIG. 3 to determine whether or not the transmission source IP address in the IP header of the received data matches a BS IP address in the table. As a result, if the transmission source IP address matches a BS IP address in the table, the system obtains an index corresponding to the BS IP address and control goes to step 1034. Otherwise, control goes to step 1034. In step 1034, a check is made to determine whether or not the GRE key stored in the GRE header of the received packet matches the uplink GRE key corresponding to the index obtained in step 1033. If the GRE key matches the uplink GRE key, the received data is a local routing target. Hence, the received data is transmitted to the decapsulation section 105 and then control goes to step 1035.

Figure 14:
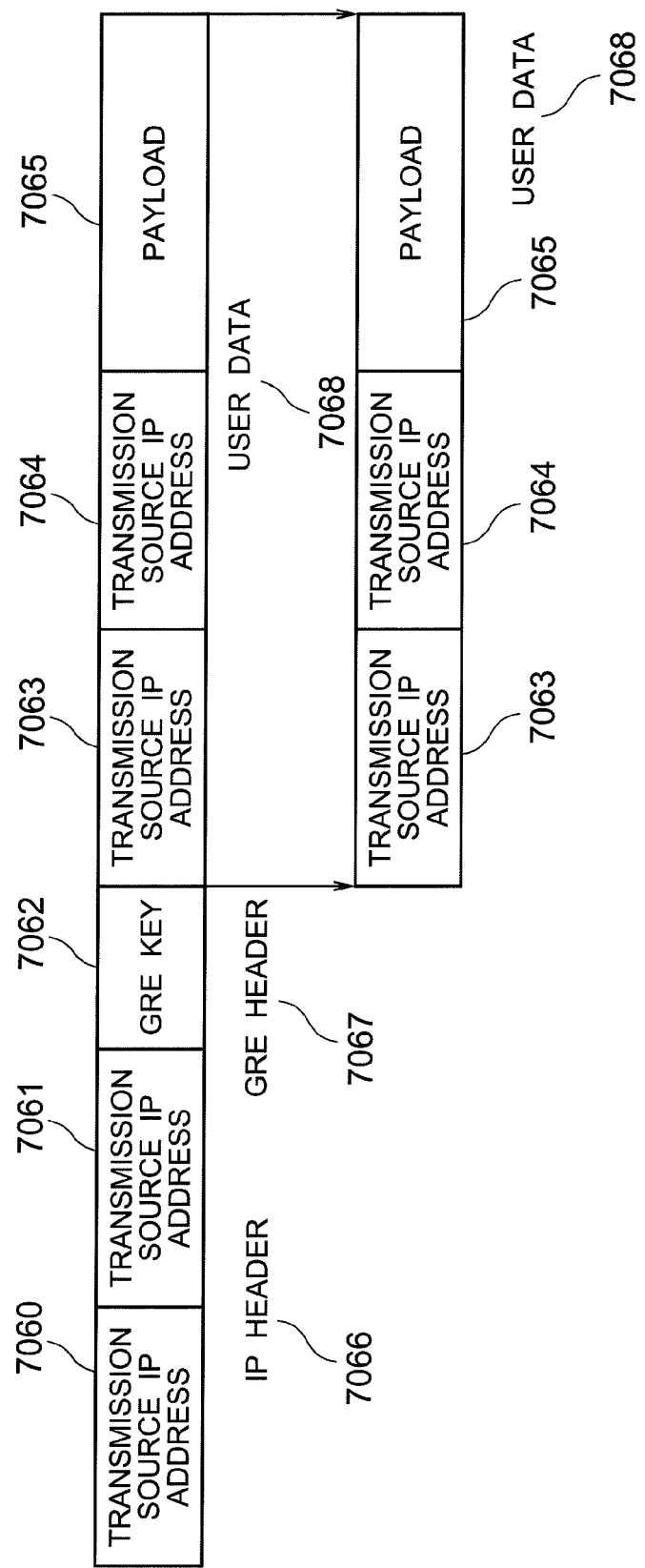
FIG. 14 is a diagram to explain decapsulation processing.

FIG. 14 is a diagram to explain the decapsulation processing. In this processing, the system removes, from the received data or the GRE capsulation data shown in FIG. 14, an IP header 7066 and a GRE header 7067 and extracts user data 7068 and then control goes to step 1036. In step 1036, the system determines the number of bytes of the user data 7068 and notifies the statistic collection section 102 of the index obtained in step 1033 and the number of bytes. In the statistic collection section 102, the number of bytes thus notified is added to the number of uplink bytes or the uplink byte count in the statistic information table of FIG. 4 corresponding to the notified index and one is added to the number of uplink packets or the uplink packet count. After the processing is finished in step 1036, the user data 7068 is transferred to the router/L3 switch section 103 and then control goes to step 1037. In step 1037, the user data 7068 is transferred according to the routing information. The destination IP address of the user data 7068 is the IP address of the internet connection destination. Hence, if the network is coupled with the internet 511, the user data 7068 is transferred from the network 520 to the internet 511. If the judgment in step 1034 to determine whether or not received data is a local routing target based on GRE keys results in mismatching between the GRE keys, the received data is not regarded as a local routing target, and control goes to step 1037 to transfer the user data 7068 according to the routing information.

On the other hand, when downlink user data from the internet 511 to the mobile station 402 arrives at the LRN 100, the user data is transferred via an I/O port 107 to the router/L3 switch section 103, and then the LRN routing processing of FIG. 13 is executed on the user data. In step 1032, a check is made to determine whether or not the protocol type in the IP header is GRE. Since data received from the internet 511 is other than the GRE capsulation data, step 1032 results in "no" and control goes to step 1038. In step 1038, a search is made through the table shown in FIG. 3 to determine whether or not the transmission destination IP address of the received data matches an MS IP address in the table. If matching results, the system obtains an index corresponding to the MS IP address and control goes to step 1039. In this step, the system determines the number of bytes of the received data for statistic collection and notifies the statistic collection section 102 of the number of bytes and the index obtained in step 1038. In the statistic collection section 102, the number of bytes thus notified is added to the number of downlink bytes or the downlink byte count 1022 in the statistic information table of FIG. 4 corresponding to the notified index and one is added to the number of downlink packets or the downlink packet count 1024. After the processing of the quantity of downlink data is finished, the user data 7068 is transferred to the encapsulation section 104 and then control goes to step 1040.

Figure 15:
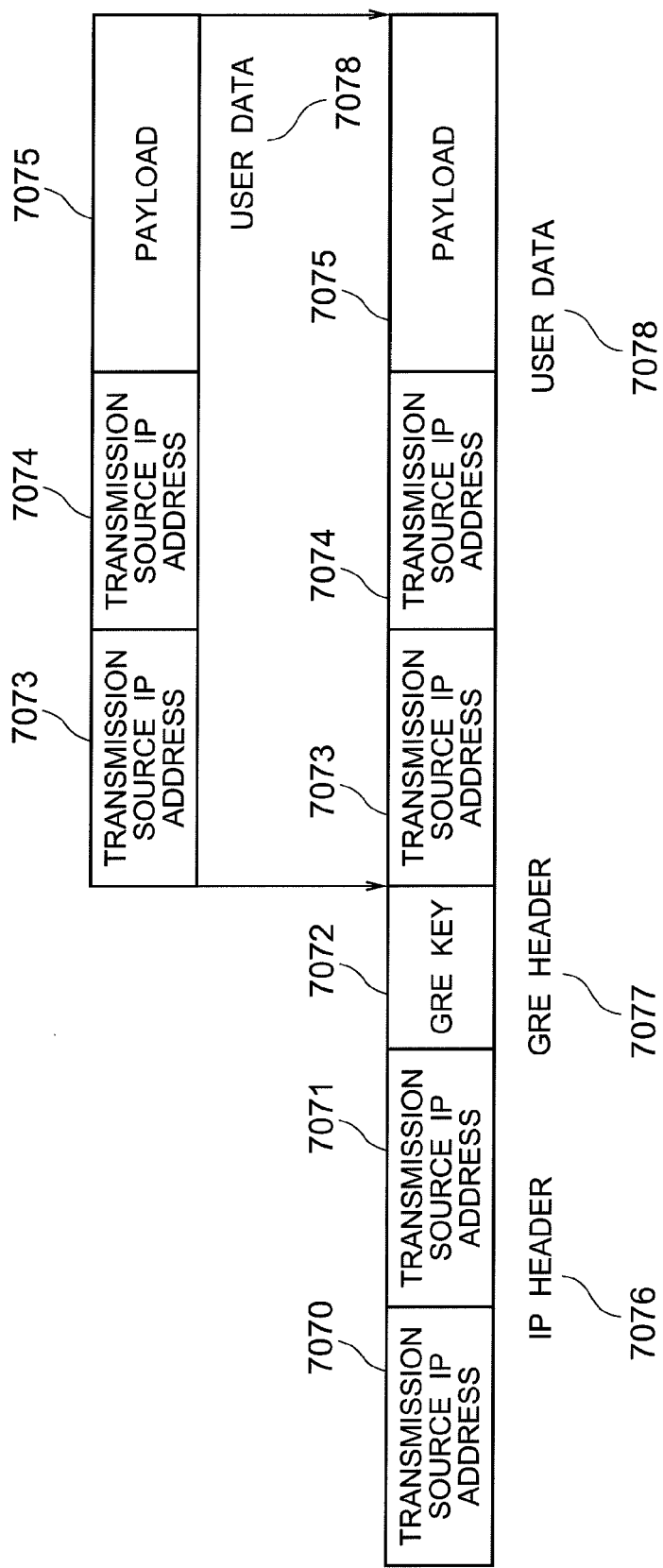
FIG. 15 is a diagram to explain encapsulation processing.

FIG. 15 is a diagram to explain the encapsulation processing. In the encapsulation processing of step 1040 of FIG. 13, a GRE header 7077 and an IP header 7076 are assigned to the user data 7078 as shown in FIG. 15. A downlink GRE key 1015 corresponding to the index obtained in step 1038 is assigned as a GRE key in the GRE header 7077. Further, a BS IP address 1013 of the index is assigned as the destination IP address, and an ASN-GW IP address 1014 is assigned as the transmission source IP address. After the encapsulation processing 1040 is finished, the GRE capsulation data is transferred to the router/L3 switch section 103 and then control proceeds to step 1037. In step 1037, the GRE capsulation data is transferred to the base station 310 according to the routing information. The base station 310 regards the data from the LRN 100 as data received from the ASN-GW 200 and transfers the data as wireless data 7011 to the mobile station 402.

Next, description will be given of a disconnection sequence.

Figure 16:
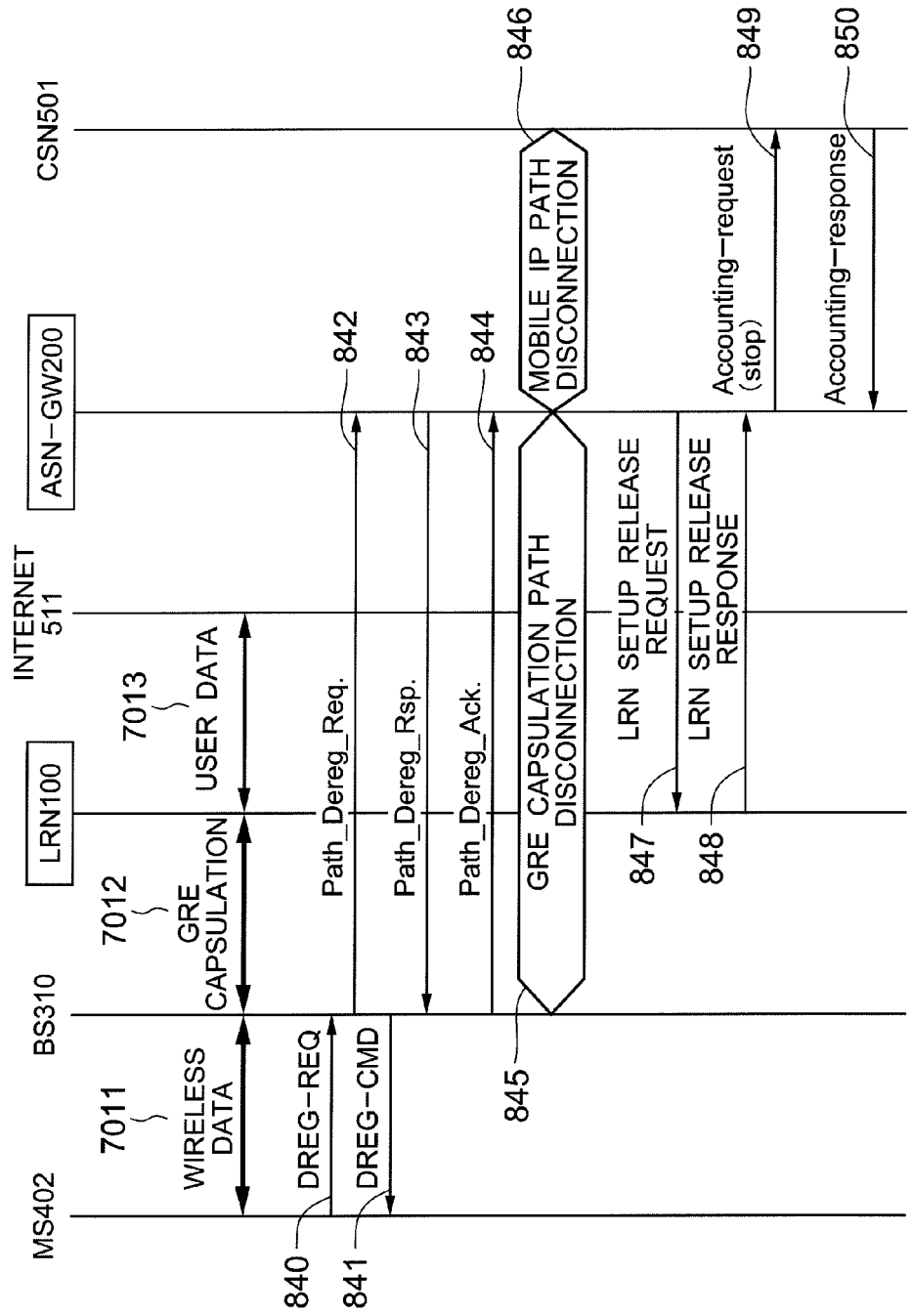
FIG. 16 is a signal sequence chart to explain disconnection processing in an embodiment of the present invention.

FIG. 16 is a signal sequence chart to explain an example of the disconnection sequence. To execute the disconnection processing, the mobile station 402 transmits DRG-REQ 840 as a disconnection request to the base station 310. Having received DRG-REQ 840, the base station 310 carries out a disconnection sequence (Path_Dereg_Req 842, Path_Dereg_Rsp 843, Path_Dereg_Ack 844) between the base station 310 and the ASN-GW 200. When conducting the disconnection sequence with respect to the base station 310, the ASN-GW 200 also disconnects a mobile IP path 846 to the CSN 500. The ASN-GW 200 sends an LRN setup release request 847 to the LRN 100. The release request 847 is in a format substantially equal to the format of the LRN setup request shown in FIG. 12. Whether the request is an LRN setup request or an LRN setup release request is determined by the information of the type 8273. The information pieces 8270 of the LRN setup release request include an MS IP address, an uplink GRE key, and a downlink GRE key. By using these information pieces, the controller 101 of the LRN 100 having received the LRN setup release request 847 searches the table of FIG. 3 for a matching index, showing coincidence among the LRN setup release request 847, the MS IP address, the uplink GRE key and the downlink GRE key, to thereby clear information associated with the index. Thereafter, the controller 101 obtains from the statistic collection section 102 of the LRN 100 the downlink byte count, the uplink byte count, the downlink packet count, and the uplink packet count corresponding to the index and sets these information pieces to the information elements 8270 of the LRN setup release response 848, and then transmits the response 848 to the ASN-GW 200.

When the LRN setup release response 848 is received, the ASN-GW 200 obtains the downlink byte count 1022, the uplink byte count 1023, the downlink packet count 1024, and the uplink packet count 1025 from the LRN setup release response 848 to store these information pieces in associated attribute fields of Accounting-Request (stop) 849 and then sends the Accounting-Request (stop) 849 to the CSN 500. On receiving the Accounting-Request (stop) 849, the CSN 500 transmits Accounting-Response 850 to the ASN-GW 200.

In this way, the mobile station 402 as the local routing target can access the internet 511 by extracting user data from the LRN 100, without passing data through the ASN-GW 200 and the CSN 500. Further, for local routing data not passing the ASN-GW 200, it is possible, by transmitting the statistic information from the LRN 100 to the ASN-GW 200 at disconnection, to notify information required for the accounting to the CSN 500.

Description has been given of an example in which the mobile station 402 accesses the internet. Additionally, description will be given of a situation in which different mobile stations 400 and 401 coupled with the LRN 100 conduct communication with each other.

Figure 17:
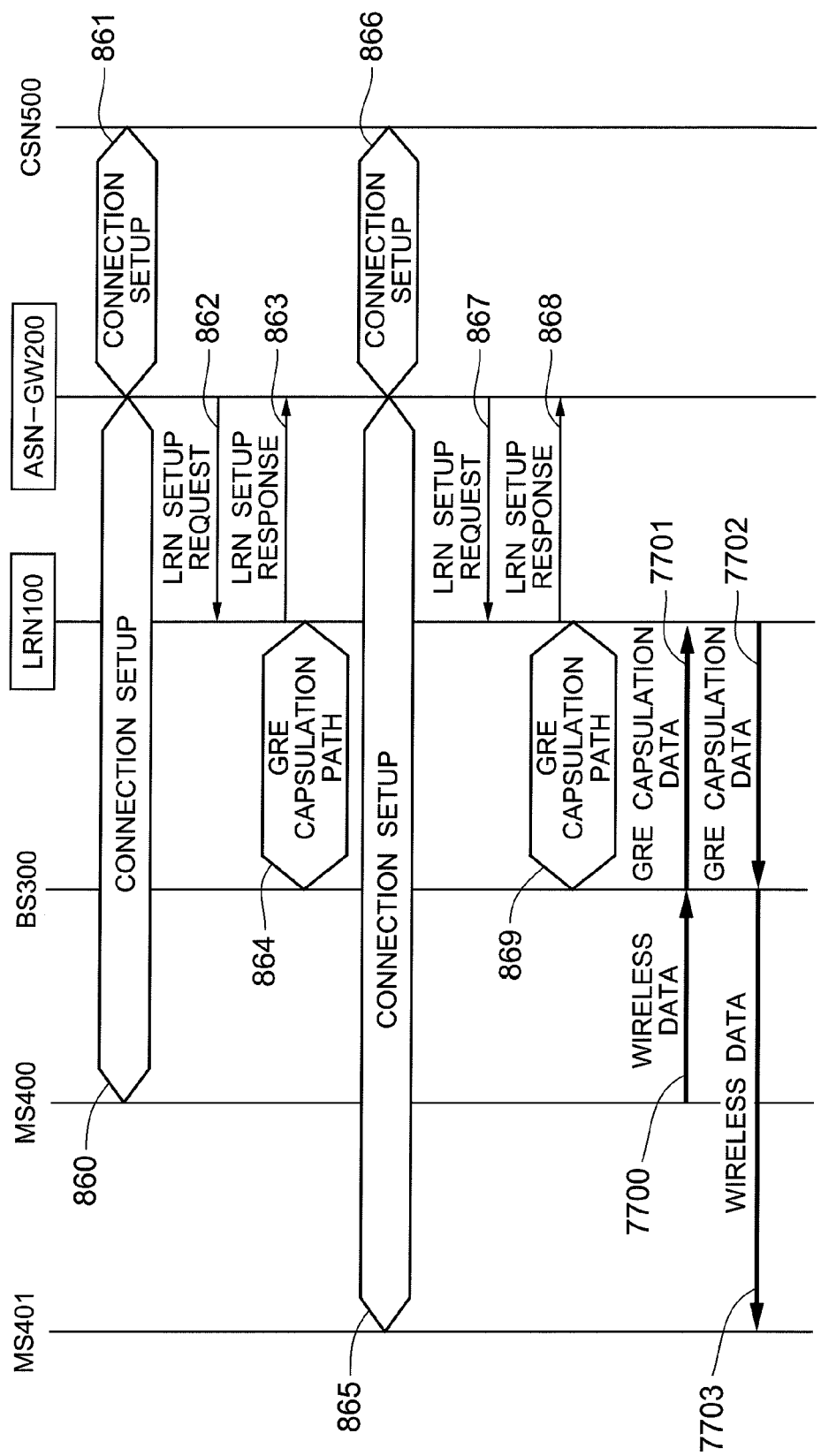
FIG. 17 is signal sequence chart to explain a connection sequence to conduct communication between two mobile stations coupled with the same local routing node.

FIG. 17 is signal sequence chart to explain a connection sequence to conduct communication between the mobile stations 400 and 401 coupled with the LRN 100.

In FIG. 17, connection setup procedures 860 and 861 and connection setup procedures 865 and 866 correspond to the connection sequence steps 800 to 825 shown in FIG. 9. As can be seen from the signal sequence of FIG. 17, when the mobile stations 400 and 401 independently carry out the connection sequence steps 800 to 825 of FIG. 9, GRE capsulation paths 864 and 869 are set up between the base station 300 and the LRN 100. Data sent from the mobile station 400 to the mobile station 401 is transferred as wireless data 7700 to the base station 300, and is then transferred as GRE capsulation data 7701 to the ASN-GW 200. The LRN 100 extracts user data from the GRE capsulation data 7701 according to the flowchart of FIG. 13, and the router/L3 switch section 103 of the LRN 100 conducts a routing operation for the user data to the destination address with the IP header of the user data having been stored in the extracted user data. If the pertinent LRN 100 accommodates an associated destination address, it is assumed that the user data has received from an I/O port 107, and then the system executes again the processing of the flowchart shown in FIG. 13. As a result, the user data is encapsulated into a GRE capsule to be transferred as GRE capsulation data 7702 to the base station 300. The base station 300 then transfers the data as wireless data 7703 to the mobile station 401.

Also, even for a handover procedure to pass through a base station or through an ASN-GW, the local routing operation can be similarly carried out.

As above, it is possible, by using the turn-back communication in the local routing node, to reduce the communication delay time.

Second Embodiment

Description will now be given of a second embodiment of the present invention in which a mobile station other than the local routing target is changed to a local routing target during communication after the connection is set up for the mobile station.

Figure 18:
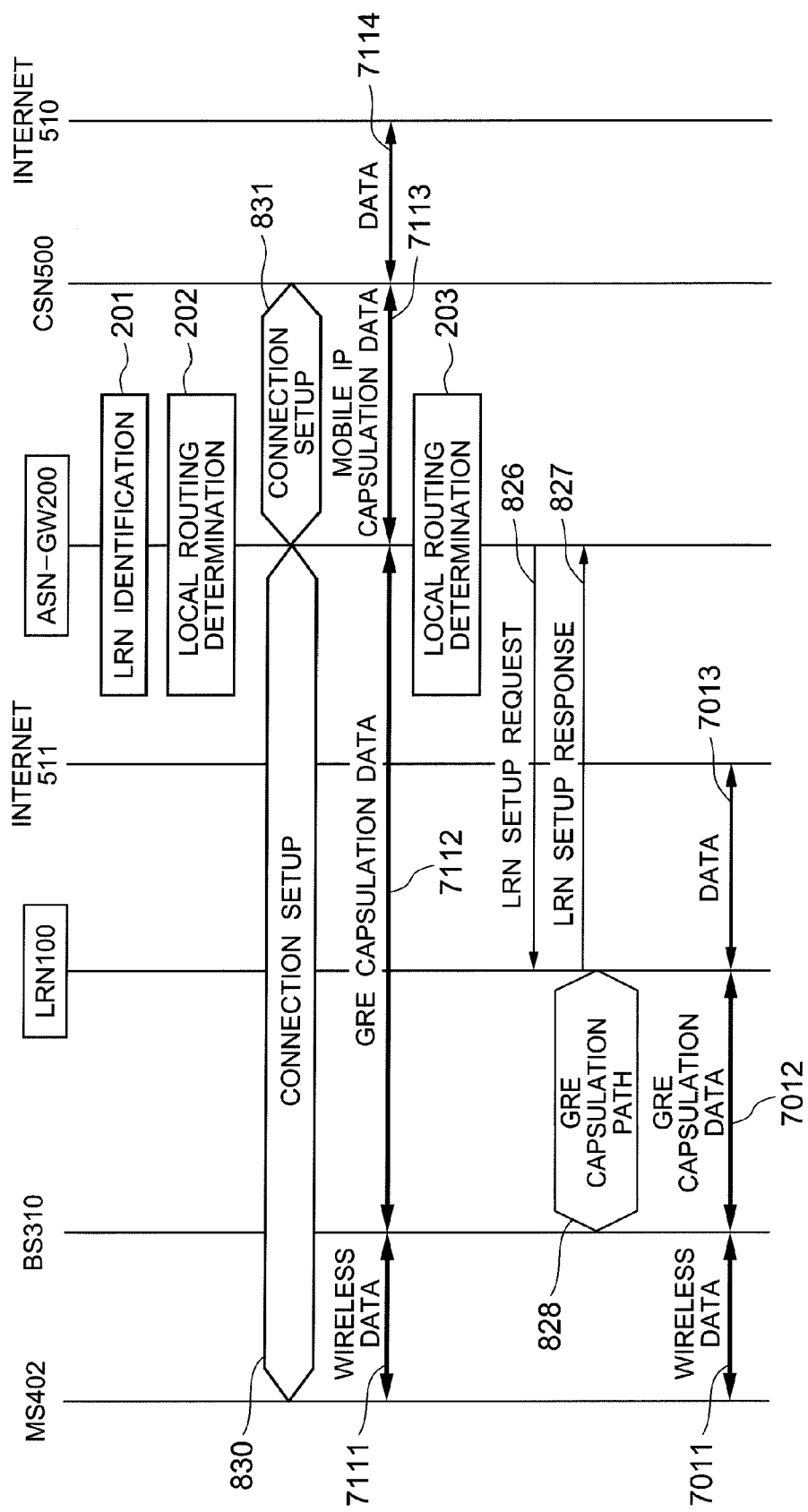
FIG. 18 is a signal sequence chart to explain processing to change the local routing setup in an embodiment of the present invention.

FIG. 18 is a signal sequence chart to explain processing to change a mobile station other than the local routing target to a local routing target. The mobile station 402 sets up connection according to the connection sequence shown in FIG. 9. During the operation, the ASN-GW 200 conducts the LRN identification 201 and the local routing judgment 202 to determine that the mobile station 402 is other than the local routing target. When the mobile station 402 desires to communicate with the internet, the mobile station 402 is coupled via the ASN-GW 200 and the CSN 500 with the internet 510.

However, the ASN-GW 200 conducts again the local routing judgment 203. As a result, if the mobile station 402 is determined as a local routing target, the ASN-GW 200 sends an LRN setup request 826 to the LRN 100 to establish a GRE capsulation path 828 between the LRN 100 and the base station 310. The LRN 100 extracts data sent from the mobile station 402 and then conducts the local routing for the data.

Figure 19:
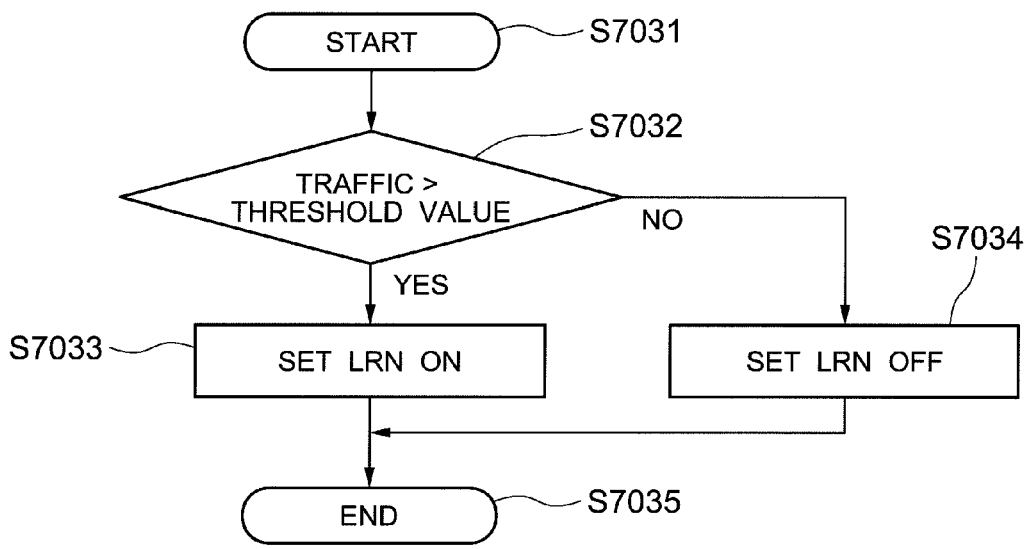
FIG. 19 is a flowchart showing an example of a processing flow to change the local routing mode.
Figure 20:
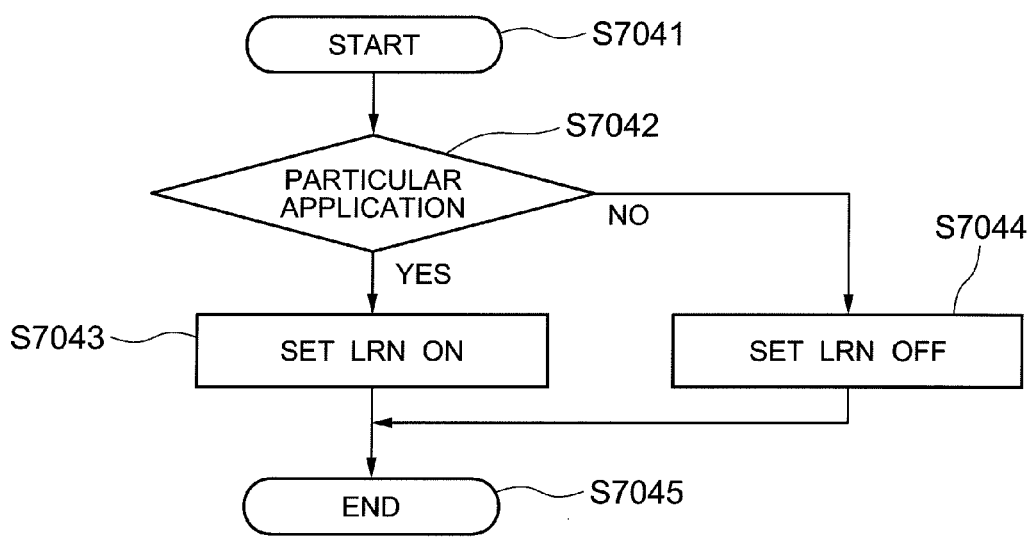
FIG. 20 is a flowchart showing an example of a processing flow to change the local routing mode.
Figure 21:
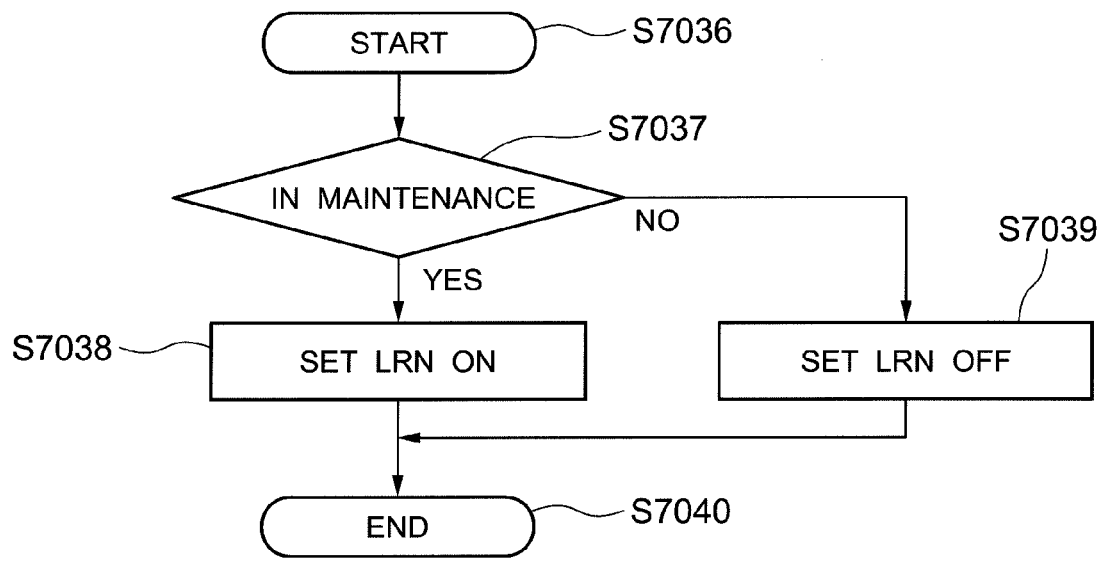
FIG. 21 is a flowchart showing an example of a processing flow to change the local routing mode.

FIGS. 19 to 21 are flowcharts showing examples of a processing flow to change the local routing mode.

During the system operation, the LRN carries out the local routing in any situation or only when the local routing is required. The local routing mode change processing shown in FIGS. 19 to 21 is executed by an LRN or an ASN-GW.

FIG. 19 shows a flow of processing to change the setting of the local routing mode based on the quantity of traffic.

This is a judge flow chart associated with the local routing judgment 203. In the processing flow of FIG. 19, if it is judged in step 7032 that the quantity of traffic through the ASN-GW 200 is more than a predetermined threshold value and the communication service is likely to be lowered, the associated mobile station is changed to a local routing target in step 7033. Conversely, if it is judged in step 7032 that the quantity of traffic is less than a predetermined threshold value, it is possible to change the mobile station to other than the local routing target in step 7034.

FIG. 20 is a processing flow to change the setting of the local routing mode based on the application type.

It is possible that if the type of user data passing the ASN-GW 200 is a particular application (e.g., P2P), only the data of the particular application is set as a local routing target. To identify the particular application, the ASN-GW includes a Deep Packet Inspection (DPI) function to judge whether or not a user data pattern extracted by the DPI function matches a pattern beforehand designated as a local routing target application. It is also possible that the particular application is detected by an external device (e.g., a firewall) to notify an IP address of a mobile station using the detected particular application to the ASN-GW.

FIG. 21 is a flowchart of a processing flow to change the setting of the local routing mode at maintenance of network devices.

For the maintenance of network devices, the maintenance engineer inputs information indicating that the maintenance is in process for a network device to a maintenance device, not shown. The maintenance device then transmits the information indicating that the maintenance is in process to the local routing node. The local routing node then makes the MS LRN mode shown in FIG. 8 ON, and thereby changes the network device to a local routing target.

In the second embodiment, it is possible, by setting user data to a local routing target or by restoring the setting of the data according to the usage thereof, to optimize the quantity of traffic in the overall system.

Third Embodiment

Description will be given of a third embodiment according to the present invention in which the LNR 100 is constructed in a configuration other than those of the LRN 100 of the first and second embodiments.

Figure 22:
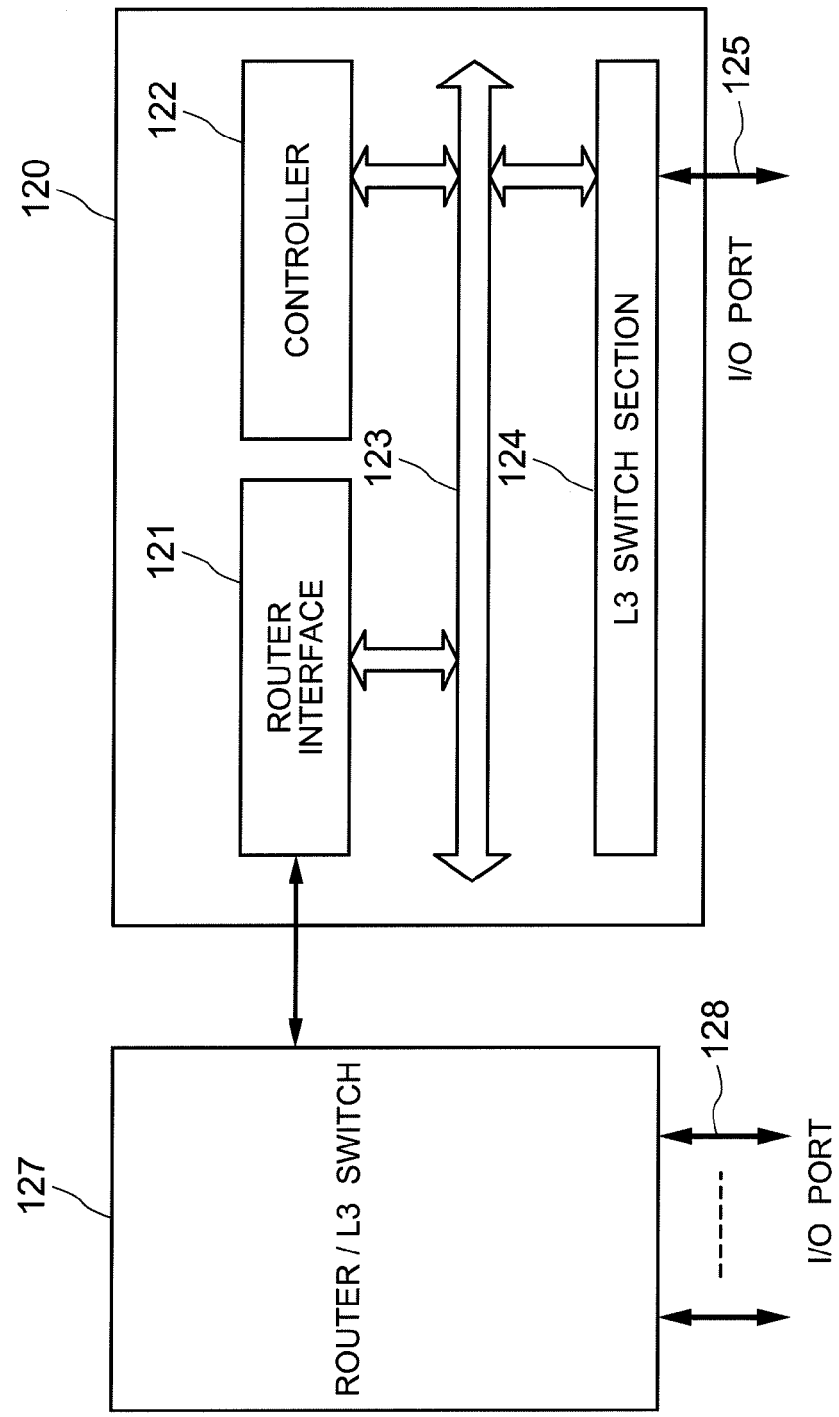
FIG. 22 is a diagram to explain a configuration of a local routing node in an embodiment of the present invention.
Figure 23:
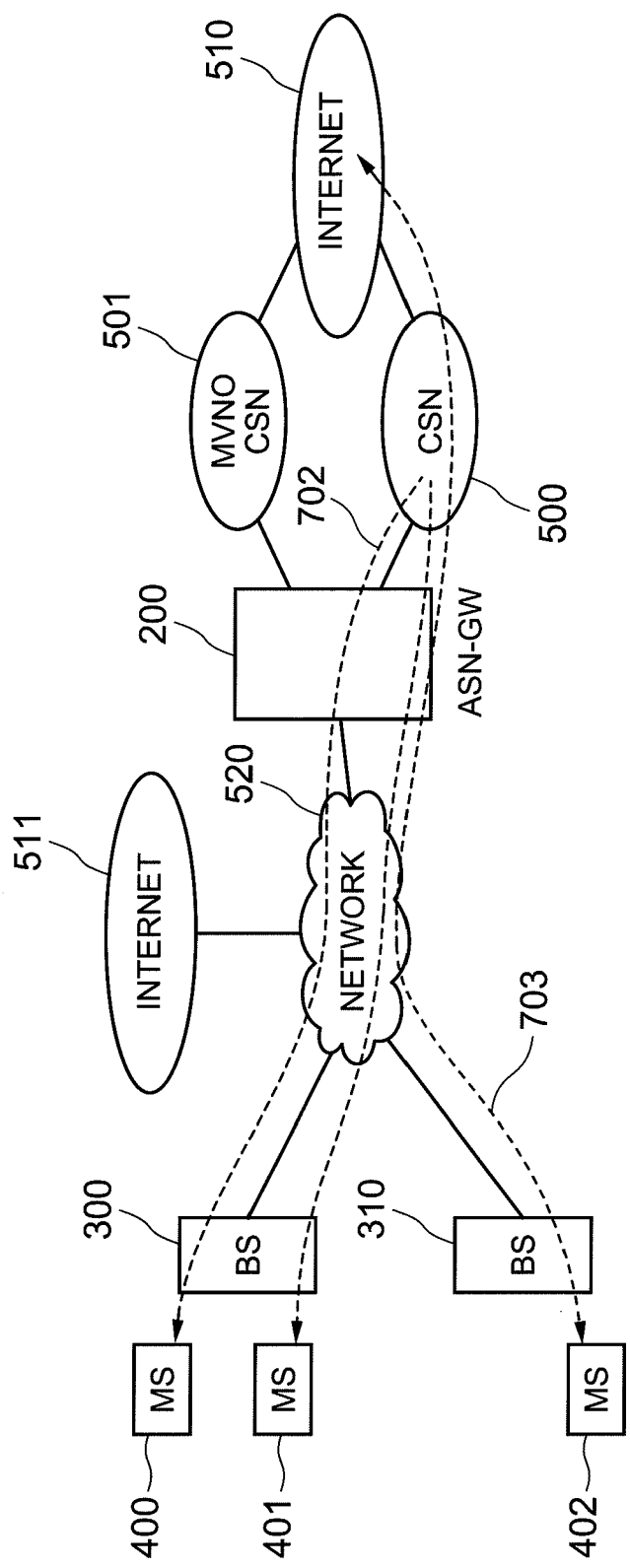
FIG. 23 is a conceptual diagram of a WiMAX system as a mobile communication system.
Figure 24:
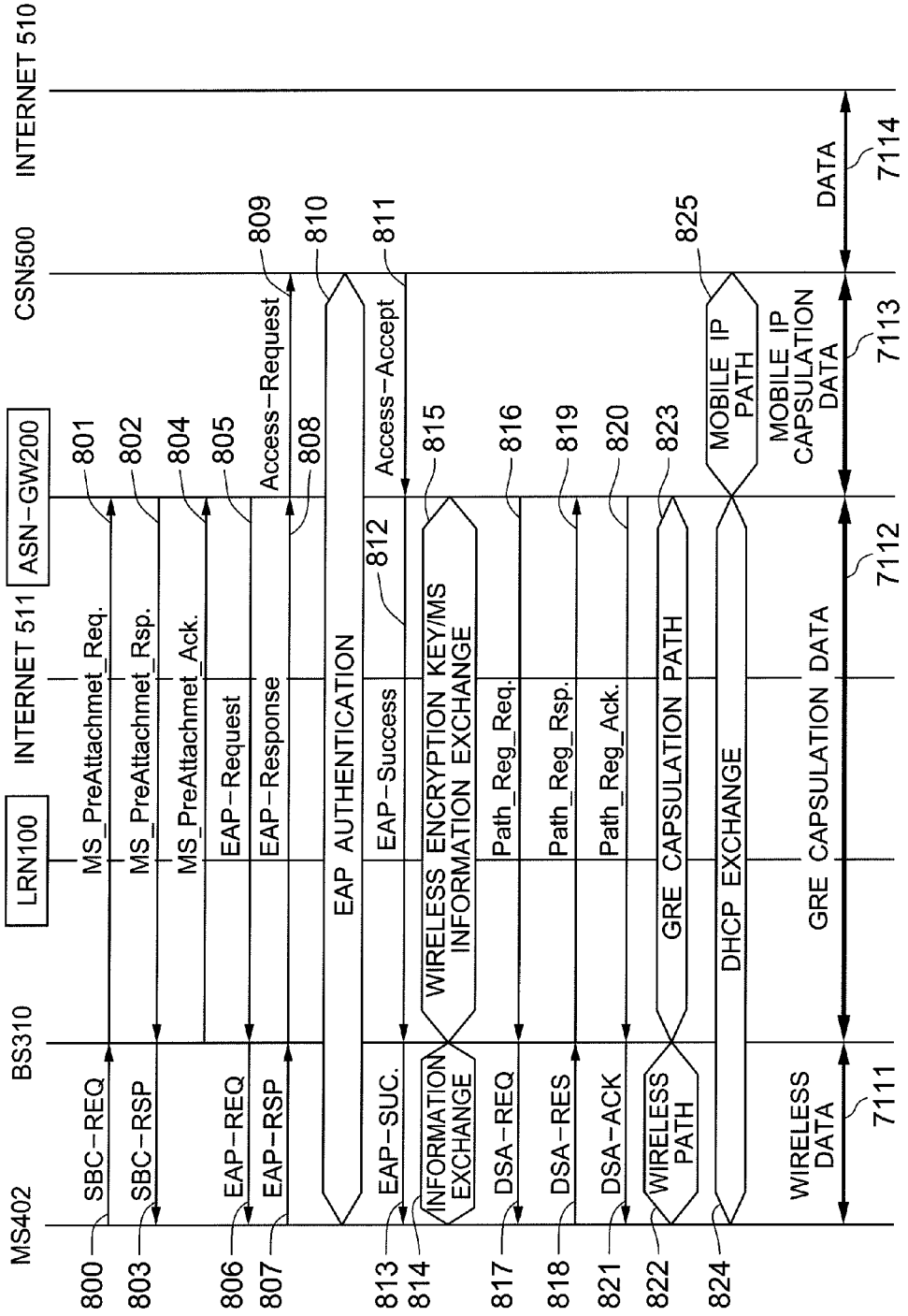
FIG. 24 is a signal sequence chart to explain a WiMAX connection sequence.
Figure 25:
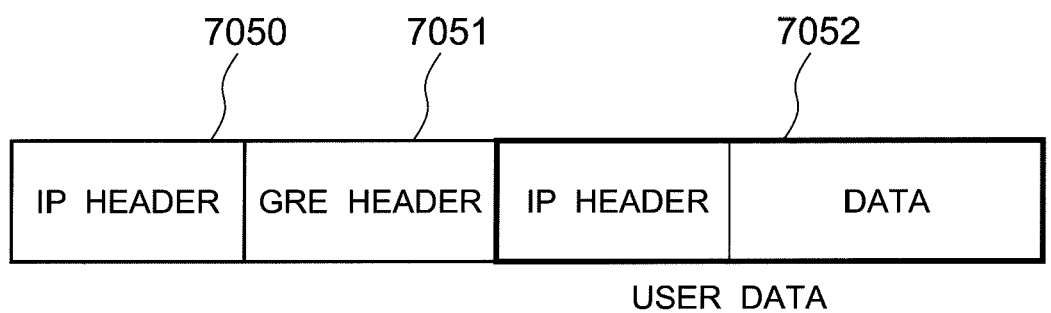
FIG. 25 is a diagram showing a packet format of GRE capsulation data.

FIG. 22 is a block diagram to explain the configuration of the LRN in the third embodiment.

The LRL 100 of the third embodiment includes a combination of a general router/L3 switch 127 and an LRN controller 120. As FIG. 22 shows, the router/L3 switch 127 includes a GRE capsulation function, and the LRN controller 120 includes I/O ports 125, a router interface 121 coupled with the router/L3 switch 127, a controller 122, an L3 switch section 124, and a connection bus 123 to couple the respective constituent components with each other.

The router interface 121 has a function to change the setting of GRE for the router/L3 switch 127. The controller 122 communicates with the ASN-GW 200 information required for the local routing as in the operation shown in FIG. 2. The I/O ports 125 of the LRN controller 120 are used for communication with the ASN-GW 200.

Description will be given of operation of the LRN 100 according to the third embodiment. When the LRN setup request 826 shown in FIG. 9 is received from the ASN-GW 200, the controller 122 of the LRN controller 120 conducts via the router interface 121 the GRE setting operation for the router/L3 switch 127. The setting operation varies depending on the type of the router/L3 switch 127. When a command is inputted according to the type, the GRE decapsulation processing and the GRE encapsulation processing are appropriately designated for the router/L3 switch 127.

The router/L3 switch 127 is coupled with a plurality of base stations. By executing the GRE processing for received data according to the setting of the GRE processing from the LRN controller 120, the LRN 100 appropriately conducts its operation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile communication system constructed in a hierarchic configuration, comprising:
    a plurality of base stations, each communicating with a plurality of mobile stations;
    a plurality of router/layer 3 (L3) switches, each accommodating some of the plurality of base stations;
    a gateway to couple the router/L3 switches via a network,
    wherein the router/L3 switches are arranged to include a first table to store local routing information, and the gateway is arranged to include a second table to store an internet protocol (IP) address of the base stations and an IP address of the arranged router/L3 switches associated with the base station IP address;
    when the gateway establishes a path between one of the base stations and the gateway in response to a connection request through the base station from one of the mobile stations, the gateway refers to the second table and judges whether the arranged router/L3 switch accommodates the base station, and in the case that the arranged router/L3 switch accommodates the base station, sends information that is needed to establish a path between the base station and the gateway to the arranged router/L3 switch;
    the arranged router/L3 switch is configured to:
        store the information received from the gateway in the first table,
        establish a path between the base station and the router/L3 switch according to the information stored in the first table,
        when the arranged router/L3 switch receives user data from one of the mobile stations through the base station, judge whether local routing is to be conducted by referring to the first table, and
        if it is determined that local routing is to be conducted for the user data, conduct the local routing for the user data in the local routing node via the established path between the base station and the router/L3 switch.

2. The mobile communication system according to claim 1, wherein:
    the local routing node further comprises a statistic information table for storing statistic information obtained when communication is carried out for the local routing target by the local routing; and the router/L3 switch obtains, at disconnection of the communication by the local routing, the statistic information from the statistic information table and transmits the statistic information to the gateway.

3. In a mobile communication system constructed in a hierarchic configuration which includes a plurality of base stations coupled via a network with a gateway through a router/layer 3 (L3) switch and each of the base stations communicates with a plurality of mobile stations, the gateway comprising:

a gateway section for performing an ordinary gateway function;

a table to store the internet protocol (IP) address of the base station and the IP address of the router/L3 switch associated with the base station IP address;

a router/L3 switch controller configured to control the router/L3 switch;

when establishing a path between one of the plurality of base stations and the gateway in response to a connection request from one of the mobile stations, the gateway refers to the table and judges whether the router/L3 switch accommodates the base station, and in the case that the router/L3 switch accommodates the base station, sends information that is needed to establish a path between the base station and the gateway to the router/L3 switch.

4. The gateway according to claim 3, further comprising:

a judgment table storing a domain name and a flag showing whether the domain name is associated with a local routing target;

wherein the gateway is arranged to:

when receiving a connection request from the mobile station through the base station, determine that local routing is to be conducted according to information included in the connection request and the judgment table, when conditions for local routing are fulfilled and the flag indicates that a local routing mode is active; and notify the router/L3 switch of an identifier of the mobile station transmitting the connection request, an identifier of the base station, an identifier of the gateway, and a key of a path established between the mobile station and the base station.

5. The gateway according to claim 4, wherein a state of the flag is arranged to be switched according to a quantity of traffic through the gateway.

6. The mobile communication system according to claim 1, wherein:

the router/L3 switches further comprise an encapsulation section and a decapsulation section; and the information received from the gateway and stored in the first table includes a mobile station address, a base station address, a gateway address, a downlink capsulating key, and an uplink capsulating key.

7. The mobile communication system according to claim 1, further comprising:

a judgment table storing a domain name and a flag showing whether the domain name is associated with a local routing target in the gateway;

wherein the gateway is arranged to:

when receiving a connection request from the mobile station through the base station, determine that local routing is to be conducted according to information included in the connection request and the judgment table, when conditions for local routing are fulfilled and the flag indicates that a local routing mode is active; and notify the router/L3 switch of the identifier of the mobile station transmitting the connection request, the identifier of the base station, the identifier of the gateway, and the key of the path established between the mobile station and the base station.

* * * * *